Aug. 5, 1952      J. L. MOORE      2,605,580

FISH BAITER

Filed June 29, 1948

J. L. Moore
INVENTOR

BY C. A. Snow & Co.
ATTORNEYS.

Patented Aug. 5, 1952

2,605,580

UNITED STATES PATENT OFFICE 2,605,580

FISH BAITER

John L. Moore, Alexandria, Minn.

Application June 29, 1948, Serial No. 35,763

1 Claim. (Cl. 43—44.8)

This invention relates to a construction applied to fish hooks, that is designed to facilitate the baiting of the hook.

In the taking of small fish, commonly called pan fish, a small bait is used, usually worms. It is well recognized that threading a worm on a hook is a slow tedious process, and the conventional method of baiting the hook with the worm results in the worm being killed.

The main object of the present invention is to provide a construction as stated above wherein the worm can be applied to the hook in minimum time and with minimum difficulty, and in a manner which will not result in killing the worm.

It is a further important object to provide a construction as described that will be very inexpensive, that will be capable of being applied to fish hooks of conventional construction, and that will achieve its intended purposes with full efficiency.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings.

Figure 1:
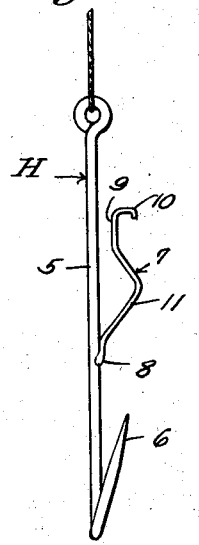
Figure 1 is a side elevational view of a baiting device constructed in accordance with the invention, applied to a fish hook.
Figure 2:
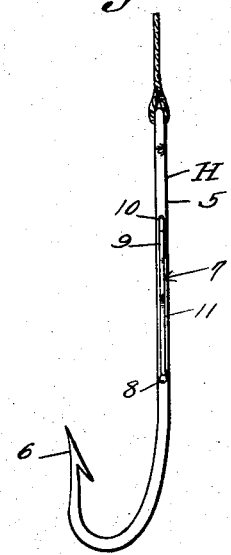
Figure 2 is an edge elevation of said device.
Figure 3:
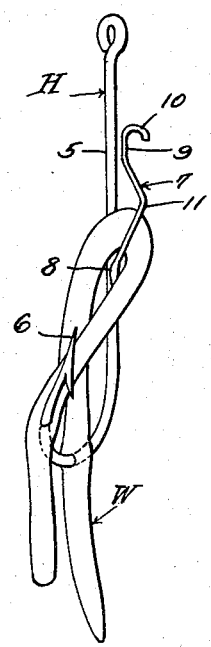
Figure 3 is a perspective view, a worm being applied to the hook.

Referring to the drawings in detail, H designates a fish hook of conventional construction, including the shank 5 merging into the barb 6.

A worm-engaging clip is generally designated 7, and may be formed from a short length of thin spring wire or the like. One end portion of clip 7 is fixedly secured to shank 5 intermediate the ends of the shank, as shown at 8, and this can be readily accomplished by soldering or the like. The other end portion 9 is spaced from shank 5 a distance preferably less than the thickness of a worm of ordinary size, so that the body portion of a worm can be entered through the space by springing the clip outwardly slightly, after which the clip returns to normal position. Said end portion 9, as seen from Fig. 1, extends parallel to the hook shank 5 for a short distance.

The free end of the end portion 9 is bent outwardly and downwardly as shown at 10, so as to eliminate the possibility of the worm's being impaled on said free end when being entered through the space. The outturned end 10 also provides a projection that can be engaged by the finger or fingernail for the purpose of springing the clip outwardly.

The inner ends of the end portions 8 and 9 merge into an outwardly bowed medial portion 11, defining in cooperation with shank 5 a space greater in breadth than the space defined between the shank and end portion 9, for receiving the body portion of a worm W. Said medial portion has a lower part that extends upwardly and outwardly from the hook shank at an obtuse angle to the portion of the shank disposed therebelow, as best seen from Fig. 1, so that the body portion of the bait is in effect wedged in the space between the clip and hook, and further, so that no part of the clip will interfere with the free movement of that part of the bait that is disposed below the fixed connection 8.

In use, the clip 7 is sprung outwardly, and the body of the worm entered through the space mentioned above. After the worm has been looped over the clip in this manner, the end portions are impaled on the barb 6, whereupon the hook is baited, and the worm continues to squirm. The entire clip, as seen from the drawings, is in a plane that is at right angles to the general plane of the hook H, it having been found that with the ends of the bait impaled in line upon the hook and disposed in the plane of the hook, and with the medial portion of said bait twisted partially around the hook so as to extend over the clip, the bait, while still having a lively squirming action, has less chance of wriggling off the clip.

Thus, it will be seen that the clip cooperates with the barb of the hook to hold the worm in one position relative to the hook, while permitting the worm to squirm in a lively manner. It may be noted, in this connection, that the crimp in the clip, whereby the end portion 9 is spaced rather closely to the hook shank, keeps the worm from wiggling out.

It is understood that although the invention has been illustrated in connection with the baiting of a hook with a worm, on larger size hooks larger clips can be used, for the purpose of baiting the hook with a frog or minnow.

What is claimed is:

The combination, with a fish hook, of a clip comprising a short length of spring wire material, one end portion of said material being immovably secured to the shank intermediate the ends of the shank, the other end portion of said material being spaced closely from the shank and extending parallel to the shank, said other end portion having a free end extending outwardly and downwardly relative to said shank, the medial position of said clip being bowed outwardly relative to the shank to an extent to define therebetween a space greater in breadth than the space defined between the shank and the second-named end portion, that part of the medial portion extending from said first-named end portion extending upwardly and outwardly from the shank at an obtuse angle to the portion of the shank disposed therebelow.

JOHN L. MOORE.

REFERENCES CITED

The following references are of record in the file of this patent:

UNITED STATES PATENTS

| Number | Name | Date |
|---|---|---|
| 94,894 | Kemlo | Sept. 14, 1869 |
| 683,750 | Guindon | Oct. 1, 1901 |
| 718,307 | Borst | Jan. 13, 1903 |
| 991,745 | Randal | May 9, 1911 |
| 1,181,942 | Underwood | May 2, 1916 |
| 1,261,601 | Ore | Apr. 2, 1918 |
| 1,498,994 | Borsuk et al. | June 24, 1924 |
| 1,741,034 | Newton et al. | Dec. 24, 1929 |
| 2,047,676 | Edmondson | July 14, 1936 |